United States Patent [19]

Zoch

[11] 4,176,093

[45] Nov. 27, 1979

[54] NEUTRON ABSORBING ROOM TEMPERATURE VULCANIZABLE SILICONE RUBBER COMPOSITIONS

[76] Inventor: Harold L. Zoch, 55 Scribner Ave., Middleburgh, N.Y. 12122

[21] Appl. No.: 770,331

[22] Filed: Feb. 22, 1977

[51] Int. Cl.$^2$ ............................................. G21F 1/10
[52] U.S. Cl. .................................. 252/478; 250/518; 260/37 SB
[58] Field of Search ....................... 252/478; 250/518; 260/37 SB

[56] References Cited

U.S. PATENT DOCUMENTS

| | | | |
|---|---|---|---|
| 3,361,684 | 1/1968 | Chvatal | 252/478 |
| 3,457,214 | 7/1969 | Modic | 260/37 SB |
| 3,701,753 | 10/1972 | Shaw | 260/37 SB |
| 3,708,467 | 1/1973 | Smith et al. | 260/37 SB |
| 3,884,866 | 5/1975 | Jeram et al. | 260/33.6 SB |
| 3,888,815 | 6/1975 | Bessmer et al. | 260/37 SB |
| 3,923,705 | 12/1975 | Smith | 260/37 SB |

FOREIGN PATENT DOCUMENTS 943714 12/1963 United Kingdom ..................... 252/478

*Primary Examiner*—Benjamin R. Padgett
*Assistant Examiner*—Deborah C. Kyle
*Attorney, Agent, or Firm*—Dean E. Carlson; Randall G. Erdley; John L. Young

[57] ABSTRACT

A neutron absorbing composition comprising a one-component room temperature vulcanizable silicone rubber composition or a two-component room temperature vulcanizable silicone rubber composition in which the composition contains from 25 to 300 parts by weight based on the base silanol or vinyl containing diorganopolysiloxane polymer of a boron compound or boron powder as the neutron absorbing ingredient. An especially useful boron compound in this application is boron carbide.

20 Claims, No Drawings

NEUTRON ABSORBING ROOM TEMPERATURE VULCANIZABLE SILICONE RUBBER COMPOSITIONS

BACKGROUND OF THE INVENTION

The present invention relates to room temperature vulcanizable silicone rubber compositions and more particularly relates to a neutron absorbing room temperature vulcanizable silicone rubber composition either of the one-component or two-component type.

Nuclear reactors for various types of uses are well known such as, for instance, nuclear reactors for the providing of electric power, etc. As is well known in the art, such nuclear reactors have to have the proper type of shielding to protect workers in the plants from the harmful rays produced in the nuclear reactions, as well as to prevent undue contamination of other physical parts of the plant other than the nuclear reactor itself. Accordingly, in the fabrication of such nuclear reactors it is well known to have lead shields to protect workers in the plant from harmful gamma rays. In such nuclear reactions there is also produced what is known as fast neutrons. Such fast neutrons which are emitted in the nuclear reaction usually pass conventional barriers and are a safety threat to workers in the plant. Also, such fast neutrons have the potential of causing normally non-radioactive metals to become radioactive.

It has been known in the art to utilize in such nuclear plants certain moderators; a moderator being a material of a high hydrogen density which slows down the fast neutrons but does not absorb them. One example of a good moderator is, for instance, water. However, as stated previously, water does not absorb the fast neutrons but just slows them down. Accordingly, it would be highly desirable to have in such nuclear plants shielding in which the shielding performs the function of both a moderator for slowing down the fast neutrons and also as an absorbent of most of the neutrons without giving off large amounts of radioactive energy or thermal energy.

Accordingly, fabricators of such nuclear plants are constantly looking for effective shielding which would perform the function of both being a moderator and an absorber of fast neutrons.

Room temperature vulcanizable silicone rubber compositions are well known. These compositions generally comprise three distinct types of room temperature vulcanizable silicone rubber compositions. First, there is the one-component system which generally comprises as the basic ingredients, a silanol end-stopped diorganopolysiloxane polymer and acetoxy or alkoxy functional silanes, filler, a catalyst which in the case of the acetoxy functional system is the metal salt of the carboxylic acid and which in the case of the alkoxy functional system is preferably a titanium catalyst. Other well known additives may be added to such compositions, for instance, to make them self-bonding or to give them other properties. The ingredients of such one-component room temperature vulcanizable silicone rubber compositions are usually mixed in the anhydrous state and packaged as such so that they are protected from contacting atmospheric moisture. Such compositions when applied and allowed to come in contact with atmospheric moisture cure to a silicone elastomer with generally the properties of having good weatherability characteristics, water repellent properties, as well as high and low temperature stability.

Another type of room temperature vulcanizable silicone rubber composition is a two-component type which comprises one-component comprised of a silanol end-stopped diorganopolysiloxane polymer, etc., and other necessary additives, and the second component usually comprising an alkyl silicate or a partial hydrolysis product of an alkyl silicate with a metal salt of carboxylic acid as a catalyst. Other ingredients may be added to these two components as is desired. The composition is packaged in two components and stored until it is desired to cure the mixture. When it is desired to cure the two components into a silicone elastomer, the two parts are simply mixed and fabricated into the part desired and allowed to cure to a silicone elastomer with properties comparable to the silicone elastomer produced by the one-component system. Such two-component system will cure either in the presence or absence of atmospheric moisture. Such compositions, that is, the one-component system that produces silicone elastomer or the two-component system that produces silicone elastomer are utilized depending on the type of application.

Another well known two-component room temperature vulcanizable silicone rubber composition comprises vinyl containing polysiloxane into which there is mixed a filler and other ingredients and which is stored as a separate component and a second component comprising a hydride silane or siloxane in combination with a platinum catalyst, which may be either solid platinum deposited on a solid carrier or a platinum complex which is more preferred. Such composition cures when the two components are mixed to a silicone elastomer with the desired properties, which composition also has flame inhibitiveness because of the platinum that is present in the composition. Such vinyl containing polysiloxanes, two-component systems, can be cured either in the presence or absence of moisture either at room temperature for a prolonged period of time, such as 24 hours, or can be cured in a matter of minutes at elevated temperatures, such as temperatures above 100° C.

A particular type of room temperature vulcanizable silicone system that is used for a particular shielding or coating will depend, of course, on whether it is desired to have the mixing of the ingredients at the construction site, as is necessary with the two-component system or if it is desired that the components be already mixed such as the one component system so that the material can be simply applied to form whatever part is necessary.

Also, the physical properties of such systems will vary from one to the other depending on the other types of ingredients in the composition and depending, of course, on the basic properties of the system itself as distinguished from each other. It is well known that such room temperature vulcanizable silicone rubber compositions could be used because of their high hydrogen density to act as moderators for fast neutrons, that is, these compositions have the ability to slow down fast neutrons when utilized as a shielding. However, such traditional room temperature vulcanizable silicone rubber compositions did not have any neutron absorbing properties. Accordingly, they could not be utilized to form a shielding for nuclear reactors when it was desired that such shielding would have both moderating and absorbing properties.

Accordingly, it is one object of the present invention to provide for a one-component room temperature vulcanizable silicone rubber composition which is both a neutron moderator and a neutron absorber.

It is an additional object of the present invention to provide for a two-component room temperature vulcanizable silicone rubber composition which is both a neutron absorber and a neutron moderator.

It is yet an additional object of the present invention to provide for a two-component room temperature vulcanizable silicone rubber composition which utilizes an SiH-olefin platinum catalyzed reaction which two-component system performs both as a neutron moderator and absorber by incorporation into the composition as a boron compound or a boron powder.

These and other objects of the present invention are accomplished by means of the disclosure set forth herein below.

SUMMARY OF THE INVENTION

There is provided by the present invention a neutron absorbing room temperature vulcanizable silicone rubber composition comprising 100 parts by weight of a silanol-terminated diorganopolysiloxane having a viscosity varying from 100 to 500,000 centipoise at 25° C., where the organo groups are monovlent hydrocarbon radicals, from 25 to 300 parts by weight of a neutron absorber selected from the class consisting of boron compounds and boron powder, from 0 to 30 parts by weight of a filler, from 1 to 15 parts by weight of a silane or siloxane having functionality selected from the class consisting of alkoxy functionality and acyloxy functionality, and from 0.01 to 5 parts by weight of a catalyst, which in the case of the alkoxy functional silane is a titanium catalyst and in the case of the acyloxy functional silane is a metal salt of a carboxylic acid.

There is also provided by the present invention a two-component neutron absorbing room temperature vulcanizable silicone rubber composition comprising (a) 100 parts by weight of a diorganopolysiloxane polymer having a viscosity varying from 100 to 500,000 centipoise at 25° C., wherein the organo groups are monovalent hydrocarbon radicals; (b) from 25 to 300 parts by weight of a neutron absorber selected from the class consisting of boron compounds and boron powder; (c) from 0 to 30 parts by weight of a reinforcing or extending filler; (d) from 1 to 15 parts by weight of a cross-linking agent selected from the class consisting of $R_a^{20}$-$Si(OR^{21})_{4-a}$, and partial hydrolysis products thereof where $R^{20}$ and $R^{21}$ are monovalent hydrocarbon radicals, a is 0 or 1, and a resinous copolymer of $R_3^{22}SiO_{0.5}$ units and $SiO_2$ units in a weight ratio of 0.5:1 to 1:1, where $R^{22}$ is a monovalent hydrocarbon radical; and (e) from 0.01 to 5 parts by weight of a metal salt of a carboxylic acid as a catalyst where the metal varies from lead to manganese in the Periodic Table.

There is also provided by the present invention a neutron absorbing silicone composition comprising (a) 100 parts by weight of a vinyl containing polysiloxane polymer of the formula,

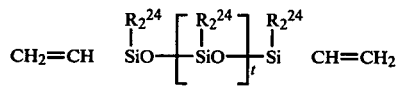

where $R^{24}$ is a monovalent hydrocarbon radical and t varies such that the polymer has a viscosity varying from 100 to 500,000 centipoise viscosity at 25° C.; (b) from 25 to 300 parts by weight of a neutron absorber selected from boron compounds and boron powder; (c) from 0 to 30 parts by weight of reinforcing or extending filler; (d) an effective amount of a platinum catalyst; and (e) from 1 to 50 parts by weight of a hydride cross-linking agent selected from the class consisting of hydrogen containing silanes and hydrogen containing siloxanes.

There is also provided by the present invention a neutron absorbing two-component room temperature vulcanizable silicone rubber composition which can advantageously be utilized to produce a silicone foam with neutron moderating and absorbing properties comprising as a basic ingredient a silanol-terminated diorganopolysiloxane polymer having a viscosity varying from 100 to 500,000 centipoise at 25° C., a hydride cross-linking agent which may be a hydrogen containing silane or a hydrogen containing siloxane, and a platinum catalyst as well as there being present in the composition or the base of 100 parts of the silanol material of from 25 to 300 parts by weight of a boron compound or boron powder. This last mentioned two component system will produce a silicone foam when the two ingredients are mixed together in the proper proportions in the presence of a platinum catalyst by the evolution of hydrogen produced by the reaction of the ingredients.

In all of the above compositions, as can be envisioned, any well known additives can be added to the basic ingredients specified above to produce a silicone elastomer or a foam having the desired physical properties as well as having neutron absorbing and neutron moderating characteristics. It should be noted, however, that any of these ingredients which are added must not conflict with the function of the boron neutron absorbing additive which is added to the composition and thus cannot poison the boron compound or boron powder as a neutron absorbing material.

It should be noted that certain boron compounds cannot be utilized with the SiH-olefin platinum SiH or OH platinum catalyzed composition and processes disclosed above since they will poison the platinum and the composition will not cure to a silicone elastomer as would be desired. An example of such a boron compound that cannot be utilized in such compositions is tetraethylborate and other alkyl borates. The most preferred boron ingredient that can be added to the above composition for producing a room temperature vulcanizable silicone rubber composition which performs the function effectively of acting both as a neutron moderator and a neutron absorber is boron carbide. It can be envisioned that all the boron compounds that are added to the above compositions must be in the form of a powder or a liquid such that they can be easily dispersed into the composition so that the final cured silicone elastomer will have a uniform neutron absorbing and neutron moderating activity.

DESCRIPTION OF THE PREFERRED EMBODIMENT

The one-component room temperature vulcanizable silicone rubber composition system comprises 100 parts by weight of a base silanol-terminated diorganopolysiloxane polymer having a viscosity varying anywhere from 100 to 500,000 centipoise at 25° C., where the organo groups are monovalent hydrocarbon radicals. This polymer may be an essentially linear polymer but can have in it up to 5 mole percent of trifunctional siloxy units and monofunctional siloxy units such that the organo to Si ratio varies anywhere from 1.9 to 2.1. Preferably the silanol-terminated diorganopolysiloxane polymer is essentially a linear polymer.

In this case when it is suggested that the organo groups for the silanol-terminated diorganopolysiloxane polymer be monovalent hydrocarbon radicals, it is understood that by such monovalent hydrocarbon radicals it is generally meant alkyl radicals such as methyl, ethyl, propyl of up to 8 carbon atoms, cycloalkyl radicals such as, cyclohexyl, cycloheptyl, etc.; mononuclear aryl radicals such as, phenyl, methylphenyl, ethylphenyl, etc.; alkenyl radicals such as, vinyl, allyl, etc. More preferably such silanol-terminated diorganopolysiloxane polymer has the formula,

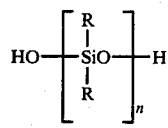

where in said formula, R is selected from the class consisting of alkyl radicals of 1 to 8 carbon atoms, phenyl radicals and vinyl radicals, and n varies from 150 to 1500.

The method of preparation of such polymer is well known in the art and as such will not be discussed in detail in the instant case.

It should be noted that a more preferable range for the viscosity for the silanol-terminated diorganopolysiloxane polymer is from 1000 to 200,000 centipoise at 25° C. For 100 parts of such silanol-terminated diorganopolysiloxane polymer there is generally present from 1 to 15 parts by weight of a silane or siloxane having functionality selected from the class consisting of alkoxy functionality and siloxy functionality.

An alkoxy functional silane cross-linking agent which may be utilized in the one-component composition of the present case is, for instance, a silane of the formula, $R^1Si(OR^2)_3$ wherein $R^1$ is selected from the class consisting of alkyl radicals of 1 to 8 carbon atoms, phenyl radicals, and alkenyl radicals of 2 to 8 carbon atoms, and wherein $R^2$ is selected from the class consisting of alkyl radicals of 1 to 8 carbon atoms. In a more general embodiment the $R^1$ and $R^2$ are selected generally from monovalent hydrocarbon radicals. Although the general range for the weight of the silane or siloxane cross-linking agent may be generally anywhere from 1 to 15 parts, a more preferred range of from 1 to 10 parts of the silane or siloxane cross-linking agent can be used. The same is true also of the acetoxy functional silane which may have a formula, $R^3Si(OOCR^4)_3$ where $R^3$ and $R^4$ are generally selected from monovalent hydrocarbon radicals and halogenated monovalent hydrocarbon radicals but wherein more preferably $R^3$ is selected from the class consisting of alkyl radicals of 1 to 8 carbon atoms, phenyl radicals and alkenyl radicals of 2 to 8 carbon atoms, and wherein $R^4$ is selected from alkyl radicals of 1 to 8 carbon atoms.

Accordingly, in the basic one-component system wherein there is present the base silanol-terminated polymer and the acetoxy functional cross-linking agent there is present from 0.01 to 5 parts by weight of a catalyst. Such a catalyst may generally be the metal salt of a carboxylic acid where the metal varies from lead to manganese in the Periodic Table such as, dibutyl tin dilaurate, dibutyl tin oxide and other well known metal salts of carboxylic acid and more specifically tin salts of carboxylic acids which may be utilized as catalysts in the instant one-component composition. It should be noted that manganese salt catalysts may not be desirable in the compositions of the instant case since in some cases irradiated manganese can give off gamma rays. Accordingly, the metal in such catalysts preferably varies from lead to iron in the Periodic Table.

In the case of the alkoxy functional one-component system it is preferred that the catalyst be a titanium chelate catalyst. The use of the alkoxy functional silane to prepare one-component room temperature vulcanizable silicone rubber compositions with a preferred titanium chelate catalyst is set forth in Beers, U.S. Pat. No. 3,708,467, which is incorporated into the present case by reference.

Accordingly, a detailed description of the titanium chelate catalyst for the one-component system will not be gone into in the present application since such information can be obtained from the foregoing Beers patent. For more details with respect to the one-component system having an acetoxy functional silane cross-linking agent, as described above as the cross-linking agent, one is referred to the patent of Harvey P. Shaw, U.S. Pat. No. 3,701,753, which is hereby incorporated in the present case by reference. Accordingly, such compositions as well as other additives that may be added into them, such as flame retardant additives or solvents, will not be described in the present application in detail since such systems are generally described in the foregoing Shaw patent.

It should be noted that there may be utilized various additives to the above one-component room temperature vulcanizable silicone rubber compositions as discussed above. It is not intended to limit the present case to specific additives. Suffice to state in the instant specification there may be added any additives that are known for such one-component systems if such additives do not conflict with the neutron absorbing properties of the boron compounds that are utilized in the instant invention. Accordingly, the other necessary ingredient in the one-component room temperature vulcanizable silicone rubber compositions of the present case are from generally 25 to 300 parts by weight of a boron compound and more preferably from 25 to 250 parts by weight of such neutron absorbing boron compound per 100 parts of the silanol-terminated diorganopolysiloxane polymer or the vinyl containing base polymer of the SiH-olefin platinum catalyzed composition as will be discussed below.

It should be noted that it is envisioned that other neutron absorbing one-component room temperature vulcanizable silicone rubber composition system may be obtained by utilizing other functional cross-linking agents such as, amine functional cross-linking agents, amide functional cross-linking agents, ketoximino functional cross-linking agents, etc. However, these systems are not as widely used as the alkoxy functional and the acetoxy functional systems which have been discussed above and as such will not be discussed in detail in this case.

There can also be obtained, utilizing the invention of the instant case, a two-component room temperature vulcanizable silicone rubber composition. Generally such composition comprises 100 parts by weight of a diorganopolysiloxane polymer having a viscosity varying from 100 to 500,000 centipoise at 25° C., wherein the organo groups are monovalent hydrocarbon radicals. Again, such a polymer may have up to 5% by weight of monofunctional siloxy units and trifunctional siloxy units. Generally it is preferred that the polymer be as linear as possible. Again the organo groups which have been specified as being monovalent hydrocarbon radicals can constitute any of those radicals that have been discussed above in connection with the one-component system. It should be noted that preferably the viscosity of the linear diorganopolysiloxane polymer has a viscosity varying anywhere from 1000 to 200,000 centipoise at 25° C.

Accordingly, preferably the polymer has the formula,

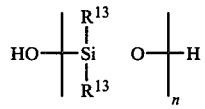

wherein $R^{13}$ is selected from the class consisting of alkyl radicals, alkenyl radicals, phenyl radicals and fluoroalkyl radicals to 1 to 8 carbon atoms, where n varies from 150 to 1500. The other basic ingredient in the instant composition in addition to the neutron absorbing boron compounds is from 1 to 15 parts by weight based on 100 parts of the base silanol materials of a cross-linking agent selected from the class consisting of $R_a{}^{20}Si(OR^{21})_{4-a}$ and partial hydrolysis products thereof, where $R^{20}$ and $R^{21}$ are monovalent hydrocarbon radicals and a is 0 or 1, or more preferably $R^{20}$ and $R^{21}$ are selected from alkyl radicals, alkenyl radicals and phenyl radicals.

In place or in conjunction with the foregoing alkyl silicate which may be utilized as a cross-linking agent in two-component systems, a resinous copolymer composed of $R_3{}^{22}SiO_{0.5}$ units and $SiO_2$ units in a weight ratio of the units of from 0.5:1 to 1:1, where $R^{22}$ is a monovalent hydrocarbon radical and mixtures thereof where $R^{22}$ again is preferably selected from alkyl radicals, alkenyl radicals and phenyl radicals. Irrespective of which cross-linking agent is utilized either the silicate or the resinous copolymer in the two-component composition of the instant case, the composition will have the proper neutron absorbing properties as long as the boron compound is incorporated into it in the amounts that will be discussed below. The composition will not cure as long as the cross-linking agent is kept separate from the silanol polymer. Accordingly, there is desirably present in the instant two-component system from 0.01 to 5 parts by weight of a metal salt of a monocarboxylic acid or dicarboxylic acid as a catalyst with the metal being selected from lead to manganese in the Periodic Table.

The use of a resinous copolymer to cure a two-component system is set forth in Modic, U.S. Pat. No. 3,457,214, which is hereby incorporated into the present case by reference. Accordingly, such two-component room temperature vulcanizable silicone rubber composition systems will not be discussed in detail since there is a disclosure as to details in the foregoing Modic patent. It should be noted that a mixture of the resinous copolymers and the alkyl silicate may be utilized as cross-linking agents in such two-component systems. The use of an alkyl silicate to prepare a two-component system along with the other ingredients, as discussed above, is set forth in Bessmer/Lampe, U.S. Pat. No. 3,888,815, whose disclosure is hereby incorporated into the present case by reference. It should also be noted that such patent discloses other additives for use in two-component systems to make it self-bonding or to enhance its physical properties and such ingredients can be utilized in the instant case so long as such additives do not conflict with the neutron absorbing properties of the boron compound additives of the instant case. It should also be noted that the catalyst is preferably a tin salt of carboxylic acid such as, dibutyl tin oxide or dibutyl tin dilaurate, as well as any other well known tin catalysts for such one-component and two-component room temperature vulcanizable silicone rubber compositions. There is disclosed in the foregoing Lampe/Bessmer case that there may be present in this composition a self-bonding additive that is a nitrogen functional silane or siloxane. Accordingly, such nitrogen functional silanes may be present as a self-bonding additive in the two-component composition of the instant case if the nitrogen functional silane does not interfere with the neutron absorbing properties of the boron compound that is incorporated into the composition of the instant case. There may also be present in the instant one-component and two-component room temperature vulcanizable silicone rubber compositions from 0 to 30 parts by weight of the base silanol polymer and more preferably from 5 to 20 parts by weight of a reinforcing filler or an extending filler. The reinforcing fillers are, for instance, fumed silica and precipitated silica. Such amounts of such reinforcing or extending fillers may be added or a mixture of reinforcing or extending fillers may be added so as to enhance the physical properties and specifically the tensile strength of the composition. Extending fillers are also well known and may be selected from titanium dioxide, lithopone, zinc oxide, zirconium silicate, silica aerogel, iron oxide, diatomaceous earth, calcium carbonate, glass fibers, magnesium oxide, chromic oxide, zirconium oxide, aluminum oxide, quartz, clay, asbestos, carbon, graphite, quartz, cotton and synthetic fibers. The only limitation on the use of such reinforcing or extending fillers in the composition is that the composition not become too viscous prior to cure such that it is difficult to work with and applied to form the appropriate shielding. Preferably, such extending or reinforcing fillers that are utilized, and this is also true of the boron compound additives, may be treated with various agents so that they will impart the proper strength characteristics to the composition in the cured state, but will not unduly increase in its viscosity in the uncured state. Such reinforcing or extending fillers as well as the boron compounds may be preferably treated with cyclicpolysiloxanes or fatty acids such as, oleic acid. There can also be utilized treatment with silazanes and a combination of treatment of such materials of the reinforcing or extending fillers with a combination of cyclicpolysiloxanes and silazanes, all of which is well known in the prior art.

As stated above, preferably the neutron absorbing boron compounds that are incorporated into the present case are also treated by fatty acids or cyclicpolysiloxanes so that they will not unduly increase the viscosity of the uncured composition while imparting to it the proper neutron absorbing properties.

It should also be noted that the reinforcing and extending fillers can be present either in the instant one-component system or the two-component system at generally a weight range of 0 to 30 parts by weight and more preferably at a concentration of 5 to 20 parts by weight, based on 100 parts of the silanol diorganopolysiloxane polymer. With respect to the preparation of the composition this is also well known. In the one-component system the ingredients are simply mixed substantially in an anhydrous state and packaged in such an anhydrous state in an air-proof and moisture-proof container. When it is desired to cure the composition, it is applied to whatever shielding application it is desired and the composition cures to a silicone elastomer in the period of time varying from one to three days in the presence of atmospheric moisture. It should also be noted that with such one-component systems although the final cure does not take place for one to three days, a skin is formed in the composition in a period of time varying anywhere from 10 to 30 minutes.

In the case of the two-component system the silanol base material is packaged separately with the filler from the alkyl silicate or the resinous copolymer cross-linking agent and the metal salt of carboxylic acid catalyst is packaged with the cross-linking agent. When it is desired to cure the composition either in the presence or absence of atmospheric moisture, the two components are simply mixed and applied, and the composition will cure to a silicone elastomer within twenty-four hours. Such a composition will normally set in a period of time varying anywhere from 10 to 30 minutes.

Finally, there are the SiH-olefin platinum catalyzed compositions which comprise 100 parts by weight of a vinyl polysiloxane polymer of Formula 1 above, where $R^{24}$ is a monovalent hydrocarbon radical and t varies such that the polymer has a viscosity generally varying from 100 to 500,000 centipoise viscosity at 25° C. and wherein the polymer more preferably has a viscosity varying from 1000 to 200,000 centipoise viscosity at 25° C. Although such monovalent hydrocarbon radicals can be any of the radicals identified above for utilization with the base silanol systems, more preferably $R^{24}$ is selected from alkyl radicals, alkenyl radicals and phenyl radicals. There may also be present in such a composition to give it strength characteristics from 0 to 30 parts by weight of a reinforcing or extending filler and mixtures thereof and more preferably from 5 to 20 parts by weight of a reinforcing or extending filler. For much the same reasons, a filler was utilized with the base silanol systems. Accordingly, such fillers can be treated or untreated as disclosed above, and are more preferably treated with cyclicpolysiloxanes or fatty acids. Secondly, per 100 parts of the base vinyl containing polymer of Formula 1, there is present as the cross-linking agent from 1 to 50 parts by weight of a hydride cross-linking agent selected from the class consisting of hydrogen containing silane and hydrogen containing siloxanes.

Finally, there is present in such a composition an effective amount of a platinum catalyst causing the ingredients to form a silicone elastomer over a long period of time at room temperature or in a matter of minutes at elevated temperatures such as temperatures above 100° C. Vinyl-terminated polysiloxanes as well as possible blends of such vinyl containing polysiloxanes as well as the hydride cross-linking agents and the method of preparation thereof are fully disclosed in Jeram/Striker, U.S. Pat. No. 3,884,866, which is hereby incorporated in the present case by reference. Accordingly, such vinyl containing polysiloxane hydride cross-linking agents in such systems will not be more fully discussed in the present case since the details of such system is fully set forth in the foregoing Jeram/Striker patent.

As far as the platinum catalyst is concerned, many kinds of platinum compounds may be utilized for such SiH-olefin addition reaction. The preferred platinum catalysts are those platinum compound catalysts which are soluble in the present reaction mixture. The platinum compound can be selected from those having the formula, $(Pt\ Cl_2.Olefin)_2$ and $H\ (Pt\ Cl_3.Olefin)$ as described in U.S. Pat. No. 3,159,601, Ashby. The olefin shown in the previous performance can be almost any type of olefin, but is preferably alkenylene having from 2 to 8 carbon atoms, a cycloalkenylene having from 5 to 7 carbon atoms of styrene. Specific olefins utilizable in the above formulas are ethylene, propylene, the various isomers of butylene, octylene, cyclopentane, cyclohexane, cycloheptane, etc. A further platinum containing material usable in the compositions of the present case is a platinum chloride cyclopropane complex (Pt $Cl_2C_3H_6)_2$ described in U.S. Pat. No. 3,159,662, Ashby. Still further the platinum containing material can be a complex formed from chloroplatinic acid with up to 2 moles per gram of platinum of a member selected from the class consisting of alcohols, ethers, aldehydes and mixtures of the above as described in U.S. Pat. No. 3,220,972, Lamoreaux.

It should also be noted in the instant composition that there may not be utilized a blend of vinyl containing polysiloxane polymers as disclosed in the foregoing Jeram/Striker case and there can be utilized only a single vinyl containing polymer specie such as that of Formula 1, in order to obtain a workable composition within the scope of the instant case. The blend of vinyl containing polymers as disclosed in the Jeram/Striker patent may be utilized in certain instances to obtain high tear properties and high tensile strength properties. There may also be utilized two-component SiH-olefin platinum catalyzed compositions which produce a silicone foam which has the foregoing desired neutron absorbing properties by having it in the boron compounds of the instant case in the foregoing concentration levels, as will be discussed below.

Accordingly, there is provided by the present case a neutron absorbing organopolysiloxane foam which is formed by reacting an organo hydrogen siloxane having an average of at least 3 silicon bonding hydrogen atoms per molecule, an average of no more than one silicon bonding hydrogen atom per silicon atom and an organic radical selected from the group consisting of alkyl radicals having from 1 to 6 carbon atoms per radical and phenyl, a hydroxylated organosiloxane having an average of not greater than 0.1 to 2.5 silicon bonded hydroxyl radicals per molecule and having an average of at least one organic radical per silicon atom selected from the group consisting of alkyl radicals having from 1 to 6 carbon atoms per radical and phenyl, and a platinum catalyst in the amount of from 5 to 200 parts by weight of platinum per one million parts by weight of total composition of said organo hydrogen siloxane and said hydroxylated organosiloxane being present in sufficient amounts to provide a molar ratio of silicon bonded hydrogen atoms to silicon bonded hydroxyl radicals of 2.5 to 40, wherein the mixtures obtained have a viscosity of less than 100,000 centipoise at 25° C., and thereafter allowing a foam to form. Such silanol containing material can be the same silanol containing organopolysiloxane polymer that was disclosed above for the silanol base system. The platinum catalyst utilized in such a composition can be any of the platinum catalysts discussed above for the SiH-olefin platinum catalyzed compositions. However, with respect to the silanol polymer that is utilized in the silanol SiH platinum catalyzed compositions, the compositions must have a viscosity varying anywhere from 100 to 75,000 centipoise at 25° C., and preferably having a viscosity varying anywhere from 1000 to 50,000 centipoise at 25° C., in order to produce a foam that has the proper cell density so as to be utilized as a neutron absorbing shielding material.

As far as the platinum catalyst and the hydride cross-linking agent such may be any hydride cross-linking agent and platinum catalyst as described above for use in the vinyl containing SiH-olefin platinum catalyzed composition and as also disclosed in the foregoing Jeram/Striker patent which was incorporated into the present case by reference.

The production of such foams is more fully set forth in the patent of Schuyler B. Smith, U.S. Pat. No. 3,923,705, which is incorporated into the present case by reference, which application also describes the addition of carbon black to such a composition that can be foamed for imparting flame inhibitive properties to the siloxane that is formed.

Accordingly, these and other additives may be utilized in the instant neutron absorbing composition along with the neutron absorbing compounds of the instant case if the additives do not interfere with the neutron absorbing properties of the boron compounds that are disclosed for use in the instant case. Such foam compositions will not be described in further detail since the details are provided in the foregoing Smith patent which is incorporated into the present case by reference.

In the case of the vinyl SiH-platinum catalyzed composition the vinyl material is packaged separately with the platinum catalyst and other additives and fillers, as well as the boron compound and the hydride cross-linking agent, is packaged separately with the platinum catalyst or without the platinum catalyst, as may be desired. The platinum catalyst may be either in one component or the other, as long as there is not present in one component both the vinyl containing material, the hydride cross-linking agent, and the platinum catalyst. When it is desired to cure the composition, the two components are mixed and allowed to cure over a prolonged period of time at room temperature or can be cured at elevated temperatures in the matter of minutes, such as temperatures above 100° C. The same is true of the silanol SiH-platinum catalyzed compositions to produce siloxane foams. With these compositions the platinum catalyst is packaged either with the hydride cross-linking agent or with the silanol material. The hydride cross-linking agent being packaged separately from the silanol material. When it is desired to cure the compositions, the two components are simply mixed into the composition to form a foam either at room temperature or at elevated temperatures. It should be noted specifically with respect to the platinum catalyzed two component systems that tetraethyl borate cannot be utilized in such a composition since it will poison the platinum catalyst and the composition will not cure.

Now, with respect to the boron additives the above compositions are made to be neutron absorbing by the incorporation in them of boron powder or boron compounds either in the form of a powder or a liquid, which can be easily dispersed along with the other ingredients. For the one-component and two-component silanol based systems, there is added to such compositions an amount from 25 to 300 parts and more preferably from 25 to 250 parts by weight of a neutron absorbing compound based on 100 parts of the base silanol-terminated diorganopolysiloxane polymer, where applicable. In the case where the base polymers of vinyl containing polymer or in the case of the platinum catalyzed siloxane foam there is again generally added from 25 to 300 parts by weight of the boron powder or boron compounds per 100 parts by weight of the vinyl containing material or the base silanol containing material in the platinum catalyzed siloxane foams and more preferably there is added from 25 to 250 parts by weight based on the base polymers of the neutron absorbing compound. Such boron compound can be either a boron powder or a boron compound, preferably a liquid, which is easily dispersable into the other ingredients. The powder should have a particle size varying anywhere from 50 to 4000 mesh, as has been stated previously. If it is a powder, such a boron powder may be advantageously treated with cyclicsiloxanes or fatty acids such as, oleic acid, so that when the powder is incorporated into the composition it will not unduly increase the viscosity of the composition prior to cure. A preferred boron compound that is utilized in the instant composition is boron carbide or other boron compounds which cannot poison any of the catalyst in the instant compositions. Examples of such boron compounds are, for instance:

$B_4C$
$B_2H_6$
$B_6H_{10}$
$B_{10}H_{14}$

The foregoing example is given for the purpose of illustrating the instant invention. It is not given for any purpose in limiting or defining the limits of the instant disclosure. All parts and percentages in the examples are by weight.

EXAMPLE 1

There is prepared a composition comprising 100 parts by weight of a silanol-terminated polydimethylsiloxane of 10,000 centipoise at 25° C., and to such base polymer there is mixed 10 parts of fumed silica treated with octamethylcyclictetrasiloxane, 250 parts of boron carbide, and to 100 parts of the above composition there is added 4 parts of a composition that was formed by mixing 99 parts of methyltrioxysilane and one part of dibutyl tin dilaurate. Accordingly, the above ingredients were mixed together in essentially the anhydrous state and packaged as such for aging for 10 days. The compositions were then applied to form shieldings of 30 cm thickness which size shieldings cured to a silicone elastomer in 24 hours and which were allowed to age for one week. When these sample shieldings were exposed to a fast neutron source of greater than 0.5 Mev neutrons the neutron stream emitting from the other side of the shieldings was reduced by greater than 95%.

I claim:

1. A neutron absorbing one component room temperature vulcanizable silicone rubber composition comprising (a) 100 parts by weight of a silanol-terminated diorganopolysiloxane having a viscosity varying from 100 to 500,000 centipoise at 25° C., where the organo groups are monovalent hydrocarbon radicals; (b) from 25 to 300 parts by weight of a neutron absorber selected from the class consisting of boron compounds and boron powder; (c) from 1 to 15 parts by weight of a silane or siloxane having functionality selected from the class consisting of alkoxy functionality and acetoxy functionality and; (d) from 0.01 to 5 parts by weight of a catalyst.

2. The composition of claim 1 wherein said silanol-terminated diorganopolysiloxane has the formula,

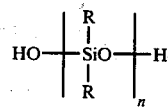

wherein R is selected from the class consisting of alkyl radicals of 1 to 8 carbon atoms, phenyl radicals and vinyl radicals, and n varies from 150 to 1500.

3. The composition of claim 1 wherein said neutron absorber is boron carbide.

4. The composition of claim 1 wherein said neutron absorber has a particle size varying from 50 to 4000 mesh.

5. The composition of claim 1 wherein there is additionally present from 5 to 30 parts by weight of a reinforcing filler selected from the class consisting of treated fumed silica and precipitated silica.

6. The composition of claim 1 wherein in (c) said silane has the formula,

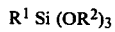

wherein $R^1$ is selected from the class consisting of alkyl radicals of 1 to 8 carbon atoms, phenyl radicals and alkenyl radicals of 2 to 8 carbon atoms, and wherein $R^2$ is selected from the class consisting of alkyl radicals of 1 to 8 carbon atoms.

7. The composition of claim 1 wherein in (c) said silane has the formula,

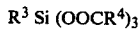

wherein $R^3$ is selected from the class consisting of alkyl radicals of 1 to 8 carbon atoms, phenyl radicals and alkenyl radicals of 2 to 8 carbon atoms, and wherein $R^4$ is selected from alkyl radicals of 1 to 8 carbon atoms.

8. The composition of claim 1 wherein the catalyst is the metal salt of monocarboxylic or dicarboxylic acid where the metal varies in atomic weights from lead to iron in the Periodic Table.

9. The composition of claim 1 wherein the catalyst is a titanium chelate.

10. A process for forming a neutron absorbing room temperature vulcanizable silicone rubber composition comprising (1) mixing (a) 100 parts by weight of a silanol-terminated diorganopolysiloxane having a viscosity varying from 100 to 500,000 centipoise at 25° C., where the organo groups are monovalent hydrocarbon radicals; (b) from 25 to 300 parts by weight of a neutron absorber selected from the class consisting of a boron compound and boron powder; (c) from 1 to 15 parts by weight of a silane or siloxane having functionality selected from the class consisting of alkoxy functionality and acetoxy functionality, and (d) from 0.01 to 5 parts by weight of a catalyst, and (2) allowing the composition to cure in the presence of atmospheric moisture.

11. A two component neutron absorbing room temperature vulcanizable silicone composition comprising as one component thereof the mixture of (a) 100 parts by weight of a diorganopolysiloxane polymer having a viscosity varying from 100 to 500,000 centipoise at 25° C., wherein said organo groups are monovalent hydrocarbon radicals; (b) from 25 to 300 parts by weight of a neutron absorber selected from the class consisting of boron compounds and boron powder; and (c) 0 to 30 parts by weight of a reinforcing or extending filler; and as the other component thereof the mixture of (d) from 1 to 15 parts by weight of a cross-linking agent selected from the class consisting of $R_a^{20} Si (OR^{21})_{4-a}$ and partial hydrolyzed products thereof where $R^{20}$ and $R^{21}$ are monovalent hydrocarbon radicals, a is 0 or 1, and a resinous copolymer of $R_3^{22} SiO_{0.5}$ units and $SiO_2$ units in a weight ratio of 0.5:1 to 1:1 when $R^{22}$ is a monovalent hydrocarbon radical and mixture thereof; and (e) from 0.01 to 5 parts by weight of a metal salt of a carboxylic acid as a catalyst where the metal varies in atomic weights from lead to iron in the Periodic Table.

12. The composition of claim 11 wherein the diorganopolysiloxane has the formula,

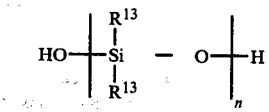

wherein $R^{13}$ is selected from the class consisting of alkyl radicals, alkenyl radicals and phenyl radicals and n varies from 150 to 1500.

13. The composition of claim 11 wherein said neutron absorber is boron carbide.

14. The composition of claim 13 wherein said neutron absorber has a particle size of 50 to 4000 mesh.

15. The composition of claim 11 wherein there is present from 5 to 20 parts by weight of a reinforcing filler selected from ground silica and precipitated silica.

16. The composition of claim 11 wherein said composition contains from 0.01 to 10 parts by weight of a self-bonding additive which is a nitrogen functional silane or siloxane.

17. A process for forming a neutron absorbing room temperature vulcanizable silicone composition comprising (1) mixing (a) 100 parts by weight of a diorganopolysiloxane polymer having a viscosity varying from 100 to 500,000 centipoise at 25° C., wherein said organo groups are monovalent hydrocarbon radicals; (b) from 250 to 300 parts by weight of a neutron absorber selected from the class consisting of boron compounds and boron powder; (c) 0 to 30 parts by weight of a reinforcing or extending filler; (d) from 1 to 15 parts by weight of a cross-linking agent selected from the class consisting of $R_a^{20} Si (OR^{21})_{4-a}$ and partial hydrolyzed products thereof, where $R^{20}$ and $R^{21}$ are selected from monovalent hydrocarbon radicals, a is 0 or 1, and a resinous polymer of $R_3^{22} SiO_{0.5}$ units and $SiO_2$ units in a weight ratio of 0.5:1 to 1:1, where $R^{22}$ is a monovalent hydrocarbon radical; and (e) from 0.01 to 5 parts by weight of a metal salt of a carboxylic acid as a catalyst wherein the metal varies in atomic weights from lead to iron in the Periodic Table, and (2) allowing the composition to cure at room temperature.

18. A neutron absorbing silicone composition comprising (a) 100 parts by weight of a vinyl containing polysiloxane polymer of the formula,

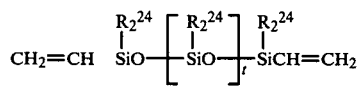

where $R^{24}$ is a monovalent hydrocarbon radical and t varies such that the polymer has a viscosity varying from 100 to 500,000 centipoise viscosity at 25° C.; (b) from 25 to 300 parts by weight of a neutron absorber selected from boron compounds and boron powder; (c) from 0 to 30 parts by weight of a reinforcing or extending filler; (d) an effective amount of a platinum catalyst; and (e) from 1 to 50 parts by weight of a hydride crosslinking agent selected from the class consisting of hydrogen containing silane and hydrogen containing siloxane.

19. A process for forming a neutron absorbing silicone composition comprising (1) mixing (a) 100 parts by weight of a vinyl containing polysiloxane polymer of the formula,

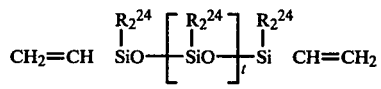

where $R^{24}$ is a monovalent hydrocarbon radical and t varies such that the polymer has a viscosity varying from 1000 to 500,000 centipoise viscosity at 25° C.; (b) from 25 to 300 parts by weight of a neutron absorber selected from boron compounds and boron powder; (c) from 0 to 30 parts by weight of a reinforcing or extending filler; (d) an effective amount of a platinum catalyst, and (e) from 1 to 50 parts by weight of a hydride crosslinking agent selected from the class consisting of hydrogen containing siloxanes and (2) allowing the composition to cure.

20. A neutron absorbing organopolysiloxane foam composition comprising (a) an organo hydrogen siloxane having an average of at least three silicon bonded hydrogen atoms per molecule, an average of no more than one silicon bonded hydrogen atom per silicon atom and organic radicals selected from the group consisting of alkyl radicals having one to six carbon atoms per radical, and phenyl; (b) a hydroxylated organosiloxane having an average of from greater than 1.0 to 2.5 silicon bonded hydroxyl radicals per molecule and having an average of at least one organic radical per silicon atom selected from the group consisting of alkyl radicals having from one to six carbon atoms per radical and phenyl, and (c) a platinum catalyst in an amount of from 5 to 200 parts by weight platinum per one million parts by weight of said total composition of said organo hydrogen siloxane and said hydroxylated organosiloxane having present in sufficient amounts to provide a molar ratio of silicon bonded hydrogen atoms to silicon bonded hydroxyl radicals of 2.5 to 40, and (d) from 25 to 300 parts by weight based on 100 parts of said hydroxylated organosiloxane of neutron absorbing compond selected from the class consisting of boron powder and boron compounds.

* * * * *

UNITED STATES PATENT OFFICE
CERTIFICATE OF CORRECTION

Patent No. 4,176,093          Dated November 27, 1979

Inventor(s) Harold L. Zoch

It is certified that error appears in the above-identified patent and that said Letters Patent are hereby corrected as shown below:

Change [76] as follows:

[76] Inventor: Harold L. Zoch, granted to U. S. Department of Energy under the provisions of 42 U.S.C. 2182.

Signed and Sealed this

Twenty-ninth Day of July 1980

[SEAL]

Attest:

SIDNEY A. DIAMOND

Attesting Officer      Commissioner of Patents and Trademarks